Figure 1:
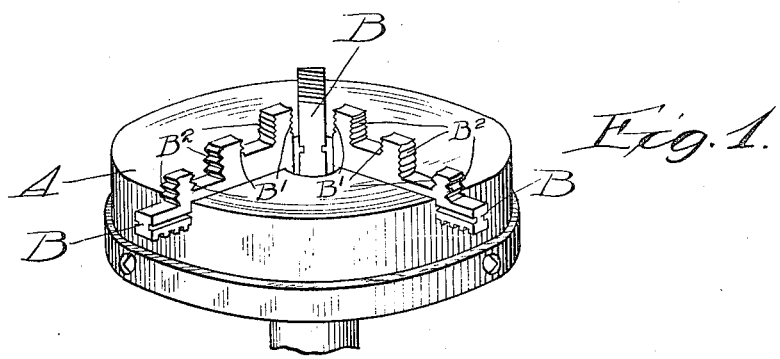

F. L. SMITH & T. B. WILLIAMS.
CHUCK.
APPLICATION FILED MAR. 26, 1913.

1,080,727.

Patented Dec. 9, 1913.

Witnesses:

Inventors.
Frank L. Smith,
Thomas B. Williams,
by Burton & Burton
their Att'ys.

UNITED STATES PATENT OFFICE.

FRANK L. SMITH, OF CHICAGO, ILLINOIS, AND THOMAS B. WILLIAMS, OF ORANGE, MASSACHUSETTS, ASSIGNORS TO LEAVITT MACHINE COMPANY, OF ORANGE, MASSACHUSETTS, A CORPORATION OF MASSACHUSETTS.

CHUCK.

1,080,727.

Specification of Letters Patent. Patented Dec. 9, 1913.

Application filed March 26, 1913. Serial No. 756,853.

*To all whom it may concern:*

Be it known that we, FRANK L. SMITH and THOMAS B. WILLIAMS, citizens of the United States, and residing, respectively, at Chicago, in the county of Cook and State of Illinois, and at Orange, in the county of Franklin and State of Massachusetts, have invented new and useful Improvements in Chucks, of which the following is a specification, reference being had to the accompanying drawings, forming a part thereof.

The purpose of this invention is to provide an improved form of chuck especially adapted for gripping and holding threaded pieces such as pipe fittings, without injury to the threads.

It consists of the features and elements described and shown in the drawings as indicated by the claims.

Figure 2:
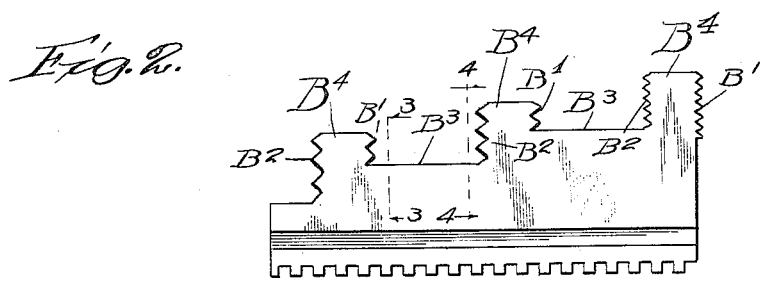
Figure 3:
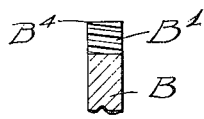
Figure 4:
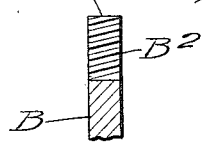

In the drawings:—Figure 1 is a perspective view of a chuck embodying this invention. Fig. 2 is a detail elevation of one of the jaw members of the chuck shown in Fig. 1. Fig. 3 is a detail section taken as indicated at line 3—3 on Fig. 2. Fig. 4 is a detail section taken as indicated at line 4—4 on Fig. 2.

The chuck shown in the drawings comprises a body portion, A, preferably of cylindrical form, in which there are slidably mounted a plurality of jaw members, B, arranged for radial adjustment toward and from the axis of the body, A. Each of the jaw members, B, is somewhat similar in general appearance to the usual stepped jaw ordinarily supplied in this form of chuck as used on lathes, milling machines and the like, but in addition to the provision of stepped gripping surfaces for the accommodation of various sizes of work, these jaw members having their gripping surfaces serrated; and the serrations are made in the form of segmental portions of threads. The most general use of this type of chuck will be for holding threaded valve fittings, and for this purpose the threads of the several gripping surfaces will be of various pitches corresponding to the usual threads on such fittings of such diameters as these several surfaces are designed to engage, respectively. It may be understood that the inwardly facing jaw surfaces, $B^1$, are concavely formed for engaging externally threaded fittings, while the outwardly facing jaws, $B^2$, are convex to conform to interiorly threaded pieces. By reason of the curvature of the gripping surfaces the jaw members are not reversible in their radial slots as in common types of lathe chucks and must, therefore, comprise complete series of both inwardly and outwardly facing jaws, this being accomplished by cutting away the material as indicated at, $B^3$, thus forming a secondary series of steps with threaded projections, $B^4$, extending from them.

It will be understood that the radial adjustment and securement of the jaws and their guide ways in the body, A, may be accomplished in any familiar manner, and this feature need not be further described.

We claim:—

1. A chuck comprising a body portion and jaw members mounted radially therein for converging and diverging movement, said members having each a plurality of shoulders forming pipe-gripping surfaces parallel with the axis toward which the jaw members converge, said shoulders being provided with serrations constituting segments of screw threads formed about said axis, the threads of said pipe-gripping surfaces being successively coarser and coarser as said surfaces are successively more and more remote from the axis, and corresponding substantially to standard threads of the pipe sizes, adapted to be gripped by said surfaces respectively.

2. A chuck comprising a body portion and a plurality of jaw members adjustably carried thereby for movement toward and from a central axis, each of said jaw members having a plurality of projections extending parallel to the aforesaid axis, the inner and outer faces of such projections with respect to said axis being serrated, and such serrations constituting segmental portions of screw threads.

3. A chuck comprising a body portion and a plurality of jaw members adjustably carried thereby for movement toward and from a central axis, each of said jaw members having a series of steps and having a projection extending from each step parallel with the aforesaid axis, the inner and outer faces of such projections with respect to said axis being serrated, and such serrations constituting segmental portions of screw threads.

4. A chuck comprising, a body portion and a plurality of jaw members adjustably carried thereby for movement toward and from a central axis, each of said jaw members having a projection extending parallel to the aforesaid axis, the inner face of said projection with respect to the axis being concave and the outer or opposite face being convex, and said inner and outer faces having serrations constituting segmental portions of female and male threads, respectively.

5. A chuck comprising, a body portion and a plurality of jaw members adjustably carried thereby for movement toward and from a central axis, each of said jaw members having a plurality of projections extending parallel to the aforesaid axis, the gripping surfaces of each projection having serrations constituting segments of a screw thread, and the threads of the several projections being of different pitches corresponding to various sizes of standard threads.

In testimony whereof we have hereunto set our hands, respectively, at Chicago, Illinois, this 14th day of March, 1913, and at Orange, Mass., this 22nd day of March, 1913.

FRANK L. SMITH.
THOMAS B. WILLIAMS.

Witnesses for Smith:
EDNA M. MACINTOSH,
ROBT. N. BURTON.

Witnesses for Williams:
GEORGE W. ANDREWS,
B. H. WALKER.